W. H. ANDERSON.
ELECTRIC CONTROL FOR KINEMATOGRAPH APPARATUS.
APPLICATION FILED NOV. 24, 1913.
1,103,858.
Patented July 14, 1914.
2 SHEETS—SHEET 1.
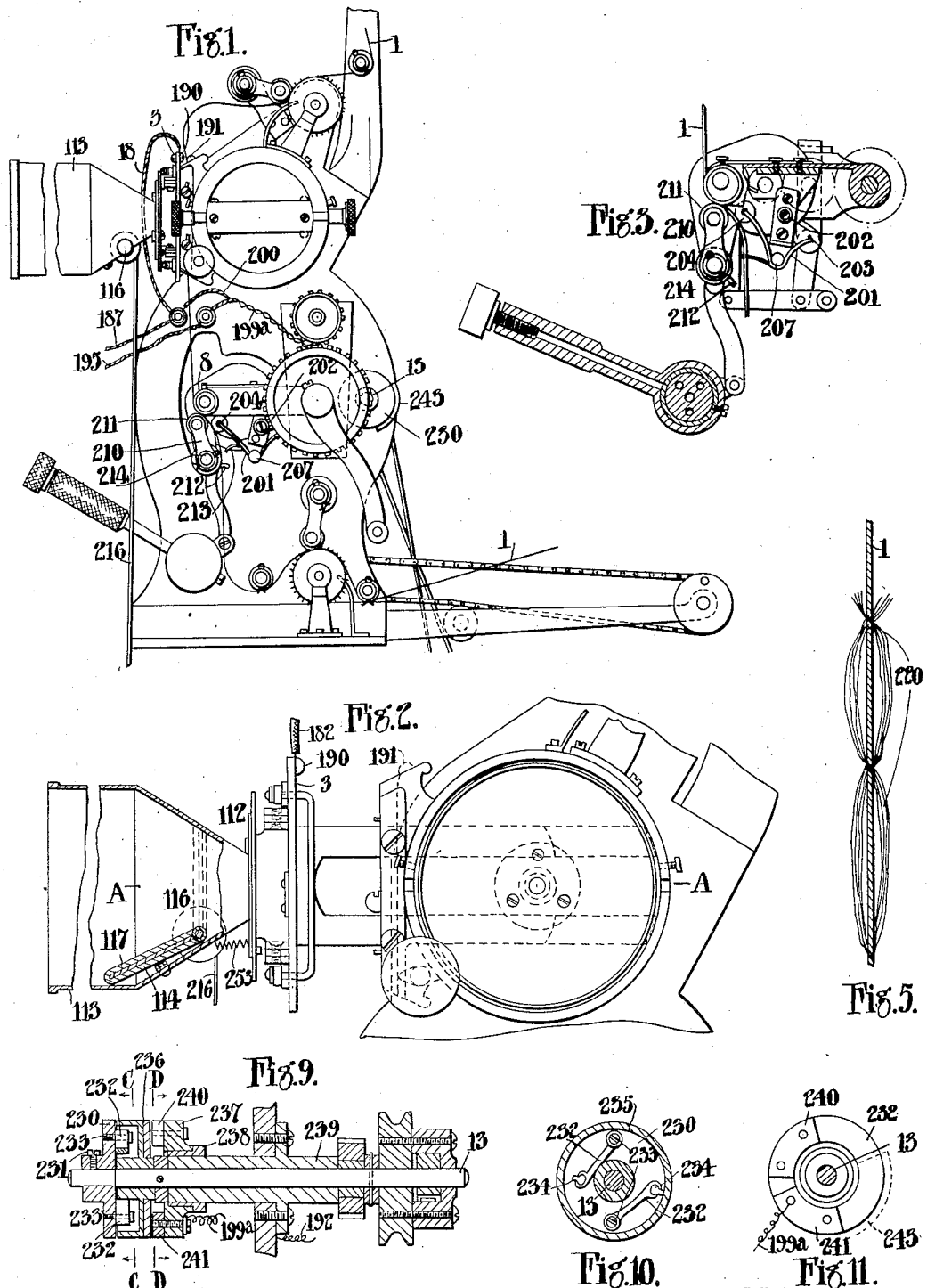

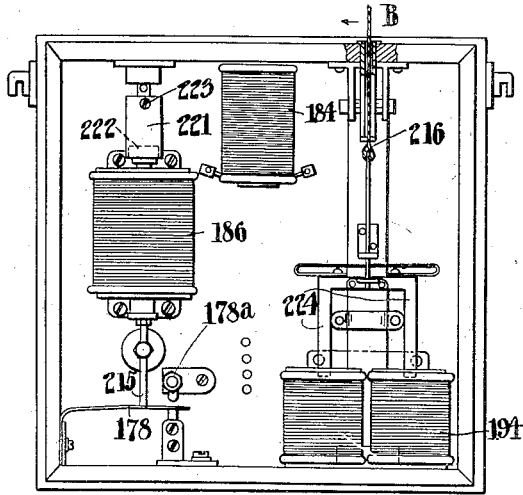
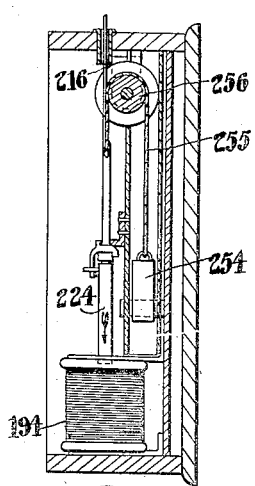
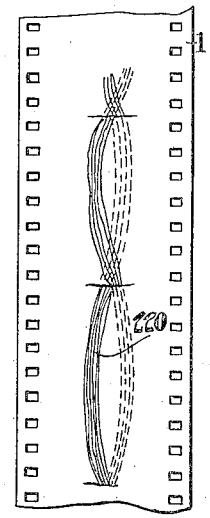
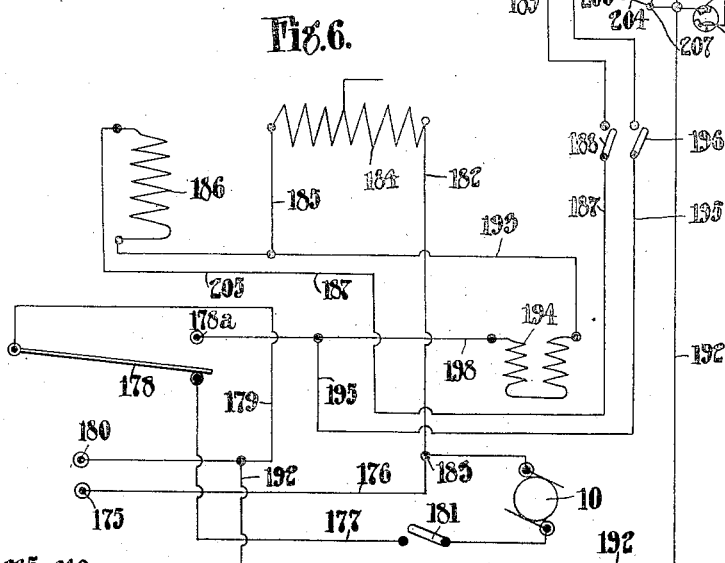
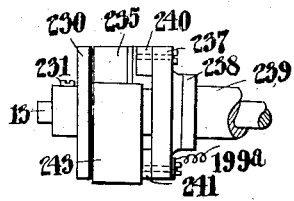

UNITED STATES PATENT OFFICE.

WALTER HILLIER ANDERSON, OF WELLINGTON, NEW ZEALAND, ASSIGNOR TO KINO LIMITED, OF WELLINGTON, NEW ZEALAND.

ELECTRIC CONTROL FOR KINEMATOGRAPH APPARATUS.

1,103,858.  Specification of Letters Patent.  Patented July 14, 1914.

Original application filed December 4, 1912, Serial No. 734,805. Divided and this application filed November 24, 1913. Serial No. 802,714.

*To all whom it may concern:*

Be it known that I, WALTER HILLIER ANDERSON, a citizen of the Dominion of New Zealand, and residing at 318 Willis street, Wellington, in the Provincial District of Wellington, in the Dominion of New Zealand, have invented certain new and useful Improvements in Electric Control for Kinematograph Apparatus, of which the following is a specification.

This invention relates to kinematograph apparatus and has for its object to provide for the electric control of the motor and the safety shutter, and more particularly adapted to such apparatus as is described in the specification of my co-pending application Serial No. 734805.

The improvements are illustrated in the accompanying drawings which will now be referred to for the purpose of a detailed description.

Figure 1 is a side elevation of a kinematograph apparatus. Fig. 2 is a sectional elevation of a lantern tunnel with safety shutter. Fig. 3 is a side elevation partly in section of a masking mechanism. Fig. 4 is an elevation, and Fig. 5 is a sectional elevation of an electric conductor attached to the film. Fig. 6 is a diagrammatic view of the electrical wiring of the apparatus. Fig. 7 is a side elevation of solenoid mechanism. Fig. 8 is a sectional elevation on line B—B in Fig. 7. Fig. 9 is a sectional elevation of the electrical cut off mechanism. Fig. 10 is a sectional elevation on line C—C in Fig. 9. Fig. 11 is a sectional elevation on line D—D in Fig. 9. Fig. 12 is a perspective view of a contact breaker. Fig. 13 is an elevation of the electrical cut off mechanism.

In the side elevation of the kinematograph apparatus (Fig. 1) the film 1 is shown passing between the terminals 190 and 191 on the gate 3 after which it passes between the film retainer and the friction roller 204 before being wound on the winding or spool.

Referring now more particularly to Fig. 6, the motor 10 used for driving the apparatus receives current from a main 175 through a wire 176, the return being effected through a wire 177, a switch 178 consisting of a flat spring contained in a box 174, and by a wire 179 to the earth return 180. This motor circuit is provided with a hand switch 181. A shunt circuit 182 taking off from the motor circuit at the point 183 includes a resistance 184, the return from which is effected through a wire 185, a solenoid 186, a wire 187, a hand switch 188, terminal 189, terminals 190 and 191 separated by an air gap, wire 192 to the earth return 180. A second shunt circuit 198 receives current from the wire 185 through the wire 193, solenoid 194, wire 195, switch 196, terminal 199, wire 199$^a$, electrical cut off mechanism 197 and wire 192 to the earth return 180. A third shunt circuit 205 receives current from the wire 185 through the solenoid 186, wire 187, switch 188, terminal 189, wire 200, switch 201, when the terminals 202 and 203 are in contact the return being effected by the wire 192 to the earth return 180. The switch 201 is provided with a friction roller 204 (see Figs. 1 and 3) which when riding upon the film 1, keeps the terminals 202 and 203 separated. If, however, the film breaks the friction roller 204 falls and the switch turns upon its pivot 207, and the said third circuit 205 is then closed by the contact of the terminal 203 with the terminal 202. When the tension of the film is relieved, say for example, by breaking through the film jamming in the gate or otherwise the terminal 203 closes upon the terminal 202 and closes the circuit 205. The solenoid 186 is energized, the core 215 is drawn in, the switch 178 opened, and the motor circuit broken and the apparatus thereby stopped. The lifting of core 215 also allows the switch 178 to close on contact 178$^a$ with the result that the solenoid 194 is energized and the safety shutter 114 immediately closed.

The film retainer 210 having a roller 211 operating with the sprocket wheel 8 has a stud 212 adapted to engage with an arm 213 of the switch 201. When therefore the retainer 210 is turned upon its pivot 214 to allow the film 1 being placed in position upon the sprocket wheel 8, the stud 212 contacts with the arm 213 and holds the switch 201 out of the way for the insertion of the film 1 upon the sprocket wheel 8. Attached to the gate member 3 is the tunnel 113 of the lantern house. Within this tunnel is arranged a fall down safety shutter 114 secured to a spindle 115 and operable by means of a button 116. The shutter is covered with asbestos 117.

The means whereby the motor is stopped and the light cut off at the end of a subject and restarted automatically for a period which may be of any desired length of time, consists in attaching a length of an electrical conductor, such as flexible wire 220 (see Figs. 4 and 5) along each face of the film where the stoppage is desired. This wire 220 bridges the air gap between the terminals 190 and 191 as the film travels between them, and thus completes the circuit 205, energizing the solenoid 186 and operating the switch 178 as previously described. The wire 220 makes a momentary connection only between the terminals 190 and 191 of the film gate during the passage of the film which latter continues to move, by the momentum of the moving parts of the apparatus beyond the said terminals, thus opening again the circuit 205. The closing of this shunt circuit energizes the solenoid 186, thereby cutting off the motor and closing the safety shutter 114. The return of the core 215 (see Fig. 7) is, however, retarded by a dash pot 221 the piston 222 of which is fixed to the core 215. Upon the descent of the core 215 the motor circuit is again closed and the motor is started afresh. The closing of the switch 178 is regulated by admitting air more or less freely into the dash pot cylinder 221 by means of a screw 223. Thus the subjects on a film may be effectually separated in their presentation upon the screen, the machine stopping at the end of one subject and automatically restarting to display the next subject. When the core in falling reaches a certain position a hole in the dash pot admits air and thereby allows the core just before its lower end touches the switch 178 to drop suddenly and thus quickly open the contact at terminal 178ª. This allows the safety shutter to open as soon as the speed of the machine is again sufficient.

The apparatus for cutting off the light comprises a solenoid 194 having a core 224, the solenoid being energized when the speed of the apparatus is slower than is required for displaying the pictures properly upon the screen. Referring more particularly to Figs. 9 to 13, a disk 230 fixed upon the shaft 13 by a screw 231, is provided with arms 232 pivoted upon pins 233. The other ends of these arms are provided with a friction pad 234 of leather or the like. The arms enter a cylinder 235 mounted freely upon the shaft 13. The cylinder 235 is separated by an insulating disk 236 from a boss 237 made of insulating material and fixed to a bush 238 secured upon a metal sleeve 239 surrounding the shaft 13. The boss 237 is provided with a stop 240 and a terminal block 241. A block 243 secured to and overlapping the edge of the cylinder 235 is adapted to contact with the terminal block 241. When the shaft 13 is rotated the arms 232 fly out by centrifugal force and when the speed of rotation is sufficiently high the friction of the pads 234 against the interior of the cylinder 235 overcomes the gravity of the block 243 turning it upon its axis and thereby separating it from the terminal 241 with which it contacts when at rest and thus opens the circuit 198 permitting the safety shutter 114 to open. So long as the block 243 is in contact with its terminal 241, current passes through the wire 185, the wire 193, and energizes the solenoid 194. The current returns through the wire 195, the wire 199ª to the terminal 241 through the block 243 through the shaft 13, sleeve 239 and wire 192 to earth. The energizing of the solenoid 194 draws in the cores 224 and pulls down a cord 216 and closes the safety shutter 114 against the operation of a spring 253 fixed at one end to a boss 254 on the spindle 115 and at the other end to the mouthpiece 112 and against the gravity of a counterweight 254 which is connected by a cord 255 to the cores 224 and passes over a friction pulley 256. The shutter is thus closed without breaking the motor circuit and stopping the motor. On the main switch 181 being closed, current passes through the solenoid 194 and immediately the safety shutter is closed. When the correct speed for the exposing of the film is reached the circuit through solenoid 194 is broken and releases the core 224 which is then raised by the counterweight 254, and the opening of the safety shutter 114 is aided by the pull of the spring 253.

Having now described my invention, what I claim as new and desire to secure by Letters Patent is:—

1. In kinematograph apparatus, a film, terminals of an electric circuit through which the film passes, an electric conductor attached along each face of the film where desired, and adapted to connect the terminals, a motor circuit, an electric motor for driving the apparatus, two shunt circuits, a motor control solenoid in one shunt circuit, a switch in the motor circuit operable by the said solenoid, a dash pot controlling the core of the solenoid, a safety shutter control solenoid in the second shunt circuit, a lamp house tunnel, a fall down safety shutter in the tunnel, a spindle to which the shutter is attached, a pulley upon the spindle, a cord wrapped upon the pulley and connected to the core of the safety shutter control solenoid, whereby when the conductor on the film connects with the terminals the motor circuit is opened energizing the safety shutter control solenoid and closing the safety shutter.

2. In kinematograph apparatus a film, terminals of an electric circuit through which the film passes, an electric conductor attached along each face of the film where desired and adapted to connect the terminals, a motor circuit, an electric motor for driving the apparatus, two shunt circuits, a motor control solenoid in one shunt circuit, a switch in the motor circuit operable by the said solenoid, a dashpot controlling the core of the solenoid, a safety shutter control solenoid in the second shunt circuit, a branch circuit from the film conductor terminals in the first shunt circuit, a notch having a roller which rests upon the film, a terminal on the roller switch adapted to contact with a terminal on the apparatus, a lamp house tunnel, a fall down safety shutter in the tunnel, a spindle to which the shutter is attached, a pulley upon the spindle, a cord wrapped upon the pulley and connected to the core of the safety shutter control solenoid whereby when the conductor on the film connects with the terminals, first mentioned, or when a breakage or slackening of the film occurs and the first shunt circuit is closed, the motor circuit is opened, which thus energizes the second solenoid and closes the safety shutter.

3. In kinematograph apparatus a film, terminals of an electric circuit through which the film passes, an electric conductor attached along each face of the film where desired and adapted to connect the terminals, a motor circuit, an electric motor for driving the apparatus, two shunt circuits, a motor control solenoid on one shunt circuit, a switch in the motor circuit operable by the said solenoid, a safety shutter control solenoid in the second shunt circuit, a branch circuit from the film conductor terminals in the first shunt circuit, a switch having a roller which rests upon the film, a terminal on the roller switch adapted to contact with a terminal on the apparatus, a lamp house tunnel, a fall down safety shutter in the tunnel, a spindle to which the shutter is attached, a pulley upon the spindle, a cord wrapped upon the pulley and connected to the core of the safety shutter control solenoid, a switch contact in the second shunt circuit adapted to contact with the motor switch for immediately closing the shutter, a centrifugal device for opening the second shunt circuit comprising a disk, a shaft upon which the disk is fixed, arms upon the disk, a cylinder mounted freely upon the shaft and into which the arms enter, a boss of insulating material, a stop and an electric terminal thereon, a metal sleeve surrounding the shaft and upon which the boss is fixed, a boss secured to the cylinder and adapted to contact with the terminal on the boss, and between which the second shunt circuit passes, whereby when the speed of the motor is sufficient to properly display the pictures, the current through the second shunt circuit is broken and the safety shutter opened.

In testimony whereof I have signed my name to this specification in the presence of two subscribing witnesses.

WALTER HILLIER ANDERSON.

Witnesses:
    BERTRAM H. MATTHEWS,
    WILLIAM H. BIRD.